(12) United States Patent
Mori

(10) Patent No.: US 7,012,215 B2
(45) Date of Patent: Mar. 14, 2006

(54) LASER MACHINING APPARATUS

(75) Inventor: Atsushi Mori, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 115 days.

(21) Appl. No.: 10/715,124

(22) Filed: Nov. 18, 2003

(65) Prior Publication Data

US 2004/0129688 A1    Jul. 8, 2004

(30) Foreign Application Priority Data

Nov. 20, 2002    (JP)    ............................... 2002/336302

(51) Int. Cl.
     *B23K 26/00*    (2006.01)

(52) U.S. Cl. ........................... 219/121.61; 219/121.62; 219/121.83

(58) Field of Classification Search ........... 219/121.61, 219/121.78, 121.81, 121.83, 121.62
See application file for complete search history.

(56) References Cited

U.S. PATENT DOCUMENTS

| | | | | |
|---|---|---|---|---|
| 5,206,889 A | * | 4/1993 | Unkrich | ........................ 377/20 |
| 5,521,696 A | * | 5/1996 | Dunne | ........................ 356/5.07 |
| 5,632,913 A | * | 5/1997 | Mori | ........................ 219/121.6 |
| 5,856,649 A | * | 1/1999 | Yamazaki et al. | ..... 219/121.67 |
| 5,959,864 A | * | 9/1999 | Mori et al. | .................. 700/159 |
| 5,961,857 A | * | 10/1999 | Takahashi et al. | ..... 219/121.62 |
| 6,144,007 A | * | 11/2000 | Levin | .................... 219/121.62 |
| 6,818,856 B1 | * | 11/2004 | Yamazaki et al. | ..... 219/121.62 |

FOREIGN PATENT DOCUMENTS

JP      09-258812      10/1997

* cited by examiner

*Primary Examiner*—M. Alexandra Elve
(74) *Attorney, Agent, or Firm*—Staas & Halsey LLP

(57) ABSTRACT

A laser machining apparatus capable of changing a laser output condition at a desired machining position and time without regard to interpolation period (ITP). When the remaining motion command amount in the former of successive blocks, used for the interpolation period Q0 between these blocks, is less than a motion command amount corresponding to a command speed in the ITP, such deficiency is supplemented by a motion command for the latter block, thus maintaining a moving speed unchanged. The laser output condition is changed between the blocks. In an ITP Q-1, a CNC sets the time period and the laser output condition in laser output control signal generating unit which changes the laser output condition when the time period has elapsed from the start of the ITP Q0, making it possible to change the laser output condition at an arbitrary time without being limited by the ITP.

16 Claims, 6 Drawing Sheets

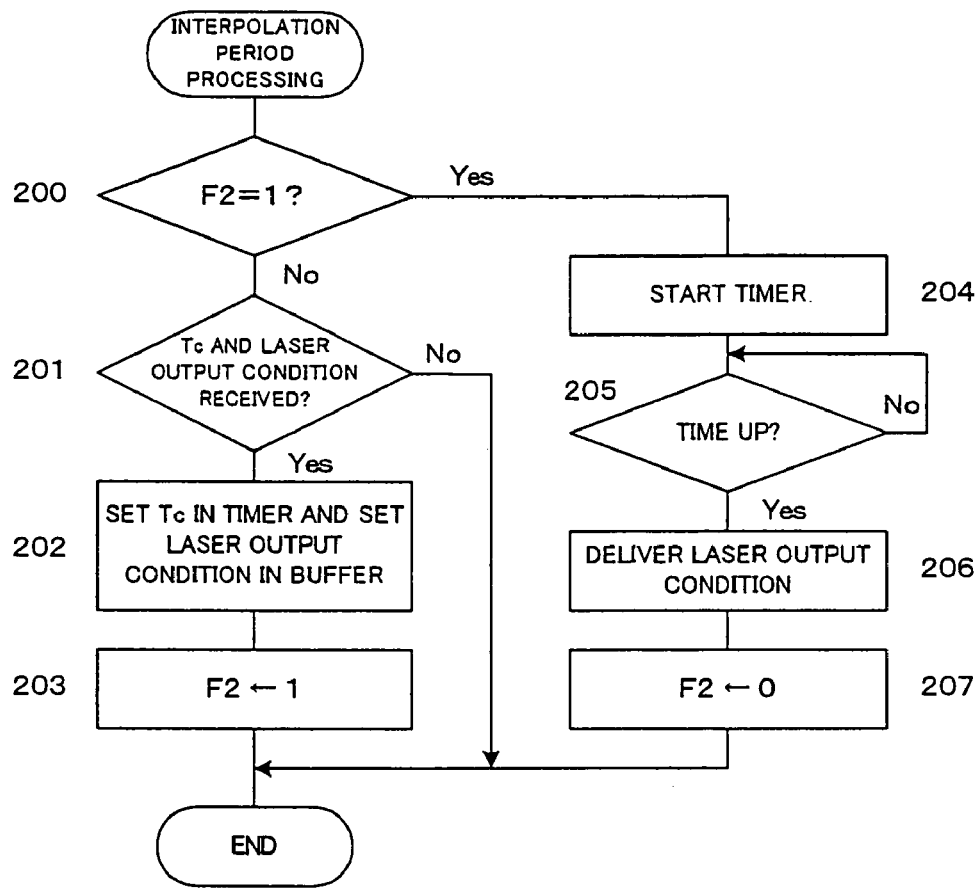

LASER MACHINING APPARATUS

BACKGROUND OF THE INVENTION

1. Field of the Invention

The present invention relates to a laser machining apparatus.

2. Description of Related Art

A laser machining apparatus generally uses a numerical control apparatus as its controller. Such numerical control apparatus for laser machining apparatus outputs a motion command at intervals of a predetermined interpolation period, to thereby move a workpiece to be machined relative to a laser head, thus performing laser beam machining. Laser output, etc. of a laser oscillator are also often on/off controlled in units of the interpolation period.

If the machining speed is not high, no substantial problem is caused so that the required machining accuracy may be attained, even when the laser output of the laser oscillator is on/off controlled in units of the interpolation period that is intended to be used for control of the numerical control apparatus. At a higher machining speed, however, it is difficult to start or finish the laser machining at intended positions with high accuracy, without the laser oscillator being controlled in the course of the interpolation period.

Motion commands of the current and next blocks in an NC machining program that is input to the numerical control apparatus are sometimes required to be executed such that a command speed is maintained unchanged between these blocks. If a remaining motion amount of the current block (the distance to go) is less than a motion amount corresponding to the command speed for one distribution period, such deficiency is supplemented by block overlap processing to add part of a motion amount for the next block to the remaining motion amount for the current block, thus obtaining the motion command for the distribution period between these blocks which is capable of maintaining the moving speed unchanged. During the block overlap processing, the movement corresponding to the motion command for one block comes to end in the course of the interpolation period, but the laser output of the laser oscillator that is on/off controlled in units of the interpolation period cannot be turned on or off at the end of the one block, i.e., between two successive blocks.

In this regard, there has been proposed to determine a current position on the basis of speed command data output from the numerical control apparatus, position data fed back from the servo control system, and a time period measured from the start of the interpolation period, and to output a machining start signal when it is determined based on the determined position that a target position is reached (see, JP-A-9-258812).

When the on/off control of the laser oscillator is performed in synchronism with the interpolation period, the on/off timing is delayed with increase in machining speed at the maximum for a period of time corresponding to the interpolation period length, resulting in inaccurate machining. Such delay can be decreased by shortening the interpolation period length so as to improve the machining accuracy, however, the shortening of the interpolation period length for speedup results in increased costs.

With the invention disclosed in JP-A-9-258812 to predict, based on the position data fed back from the servo control system, when the machining start/end position will be reached, the accuracy of machining start/end position can be improved irrespective of the interpolation period length. On the other hand, this technical art poses a problem that overall operational processing becomes complicated since the feedback position data signal must be reprocessed and additional processing must be made to compensate for a change in machining speed.

SUMMARY OF THE INVENTION

The present invention provides a laser machining apparatus which is capable of changing a laser output condition at a desired machining position and at a desired point of time without regard to an interpolation period.

A laser machining apparatus of the present invention comprises: a laser beam machine having a machining head for irradiating a laser beam on a workpiece; a laser oscillator for generating the laser beam; a controller for controlling the laser beam machine by delivering motion commands to move the machining head relatively to the workpiece at predetermined interpolation periods, and controlling the laser oscillator to output the laser beam in accordance with motion of the machining head of the laser beam machine, the controller including timing data generating means to generate timing data defining time to deliver a laser output control signal to the laser oscillator in terms of a time period from a start of an interpolation period in which the laser output control signal is to be delivered, or in terms of a ratio of dividing the interpolation period; and a laser output control signal generating means to receive the timing data from the timing data generating means and delay a delivery of the laser output control signal to the laser oscillator by the time period from the start of the interpolation period or by a time period calculated based on the ratio of dividing the interpolation period. With the present invention, a laser output condition can be changed without regard to the interpolation period.

The controller may deliver a machining condition designation signal to designate a laser output condition including on/off of the laser output or to select one of laser output conditions stored in the laser output control signal generating means to the laser output control signal generating means, together with the timing data.

The timing data may be provided in terms of a ratio between motion amounts of successive motion commands for the interpolation period in which the motion amounts of the successive motion commands are added together or in terms of a value calculated based on the ratio.

The timing data generating means may determine the time period from the start of the interpolation period based on elapsed time from a start of machining and a set time period. Further, the timing data generating means may determine the timing data taking account of one or both of a delay time in a servo feedback system for processing motion commands and a delay time in the laser oscillator.

A predetermined period at which the signal is delivered to the laser output control signal generating means may be several times longer than the predetermined interpolation period at which the motion command is delivered. The timing data generating means may deliver the timing data to the laser output control signal generating means at an interpolation period one period prior to the interpolation period in which the laser output control signal is to be delivered.

BRIEF DESCRIPTION OF THE DRAWINGS

FIG. 6 is a flowchart showing processing performed by laser output control signal generating means in the embodiment;

FIG. 7 is a view for explaining a table used in another embodiment of this invention;

DETAILED DESCRIPTION

Figure 1:
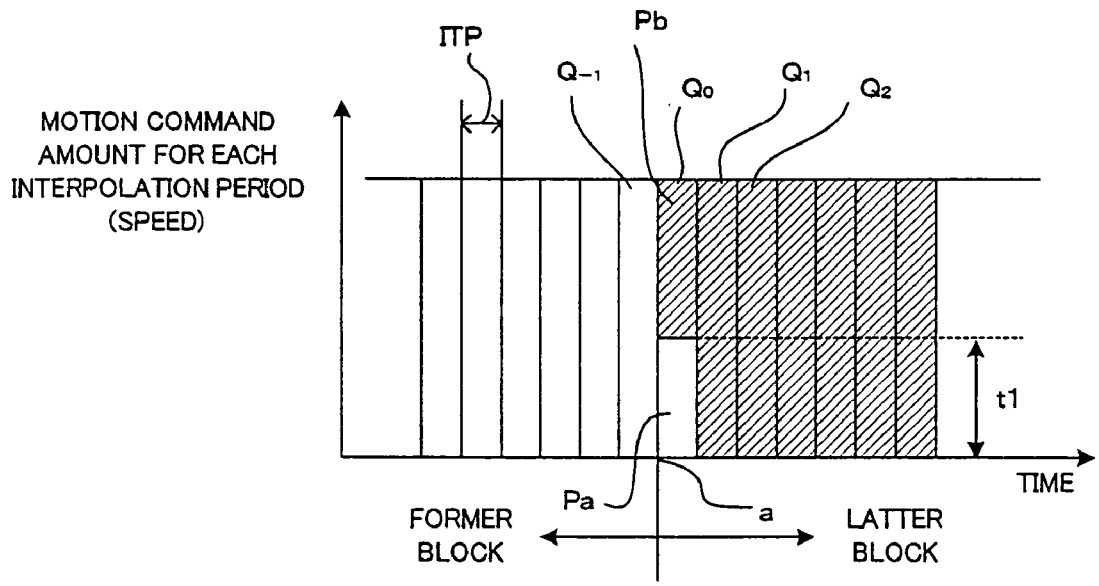
FIG. 1 is a view for explaining the principle of this invention.

FIG. 1 is a view for explaining the principle of this invention. In FIG. 1, time is taken along the abscissa, an amount of motion command (corresponding to speed) for every interpolation period ITP is taken along the ordinate, and a boundary between two successive blocks is shown, with the former or preceding block being indicated in white and the latter or next block indicated by hutching. In the block overlap processing, if the remaining amount of movement Pa for the preceding block is less than the motion command amount per interpolation period corresponding to a commanded speed, such deficiency is supplemented by adding part of movement amount Pb for the next block to the remaining movement amount, thereby obtaining a motion command for the distribution period at the boundary between these two blocks, so that a constant speed movement may be attained. Conventionally, in a case where a laser output on/off condition, etc. are changed at the boundary between blocks, such change is made in units of interpolation period ITP, and therefore, a laser output on/off command, for instance, is supplied to the laser oscillator at a time point of a in FIG. 1 at which the movement based on the motion command instructed in the next block (hutched portion) starts.

In this case, the laser output on/off command is not delivered at the movement start position instructed in the next block, i.e., at the end position determined by the motion command instructed in the preceding block, but is delivered earlier by the remaining movement amount Pa of motion command of the preceding block, i.e., at a position different from the intended position, resulting in degraded machining accuracy. In addition, the remaining movement amount Pa varies depending on the amount of movement and speed instructed in the preceding block, and is not constant.

If a command for changing the laser output on/off condition is output when the remaining amount Pa of movement for the preceding block has been delivered and decreased to zero in the interpolation period $Q_0$ at the boundary of the blocks, the laser output condition can be changed at the instructed position. However, such change cannot be realized by a numerical control apparatus serving as a controller to control a laser beam machine and carrying out a control operation solely in units of interpolation period. In this invention, therefore, such control is carried out with the aid of laser output control signal generating means, mentioned later.

Meanwhile, the laser output control signal can also be used to change the power level of the laser output other than changing the on/off state thereof. For instance, in case a thin metal plate is subject alternately to cutting and marking, the laser output condition is changed such that a relative high output at, e.g., 1000 W (Duty 100%) is used for cutting, whereas a low output, i.e., pulsed output (1000 W, 1000 Hz, 20%) is used for marking. This invention is intended to make it possible to change such laser output control signal without regard to the interpolation period.

To this end, a command for changeover of output conditions such as laser output on/off state is delivered at a time point when the remaining motion amount Pa for the preceding block has been output. In case the amount of movement corresponding to the instructed speed is attained by adding the partial amount Pb of movement for the next block to the remaining motion amount Pa for the preceding block, the motion amount (Pa+Pb) is output in the interpolation period ITP. Thus, a time period t1 from a time point of a at which the interpolation period $Q_0$ at the boundary of the blocks starts to when the output of the remaining motion amount Pa of the preceding block is completed can be determined in accordance with the following formula (1):

$$t1 = ITP \times Pa/(Pa+Pb) \quad (1),$$

wherein Pa/(Pa+Pb) is a ratio between the motion amounts.

To be noted, when a motion command is supplied to the servo control system for controlling the drive of axis servomotors for moving a workpiece to be machined, there is a delay between the supply of the motion command and the motors being actually driven to move the workpiece to reach a target position. Another delay is caused by a servo error amount (positional deviation) in position control by the servo control system and caused by an acceleration/deceleration constant. Further, there is a delay between receipt of a command by the laser oscillator and the laser output therefrom. These delay times are added up to determine a total delay time t2. In order to change the laser output condition such as the on/off state just when a workpiece reaches a target position, a laser output control signal to change the laser output condition must be output after elapse of a time period T obtained by adding the delay time t2 to the time period t1 determined in accordance with formula (1) and measured from the time point a at which the interpolation period $Q_0$ starts. The t1 represents a time period required for the sum of the remaining motion amount Pa for the preceding block and the partial motion amount Pb for the next block to be output, wherein the sum represents a motion amount per interpolation period ITP corresponding to the command speed.

$$T = t1 + t2 \quad (2)$$

Figure 2:
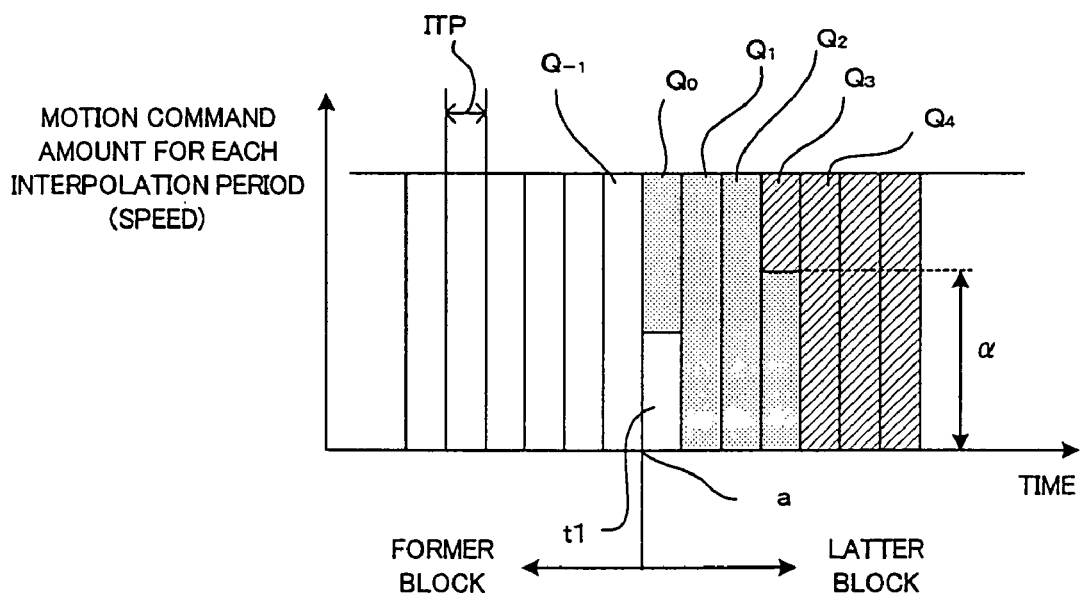
FIG. 2 is a view for explaining the principle of this invention where a delay time is taken into consideration.

In the example shown in FIG. 2, a dotted area corresponds to the delay time. Thus, the laser output control signal is output in the course of the interpolation period $Q_3$, at which the time period T determined from formula (2) has elapsed from the time point of a, whereby the laser output condition can be changed at the commanded position.

Figure 3:
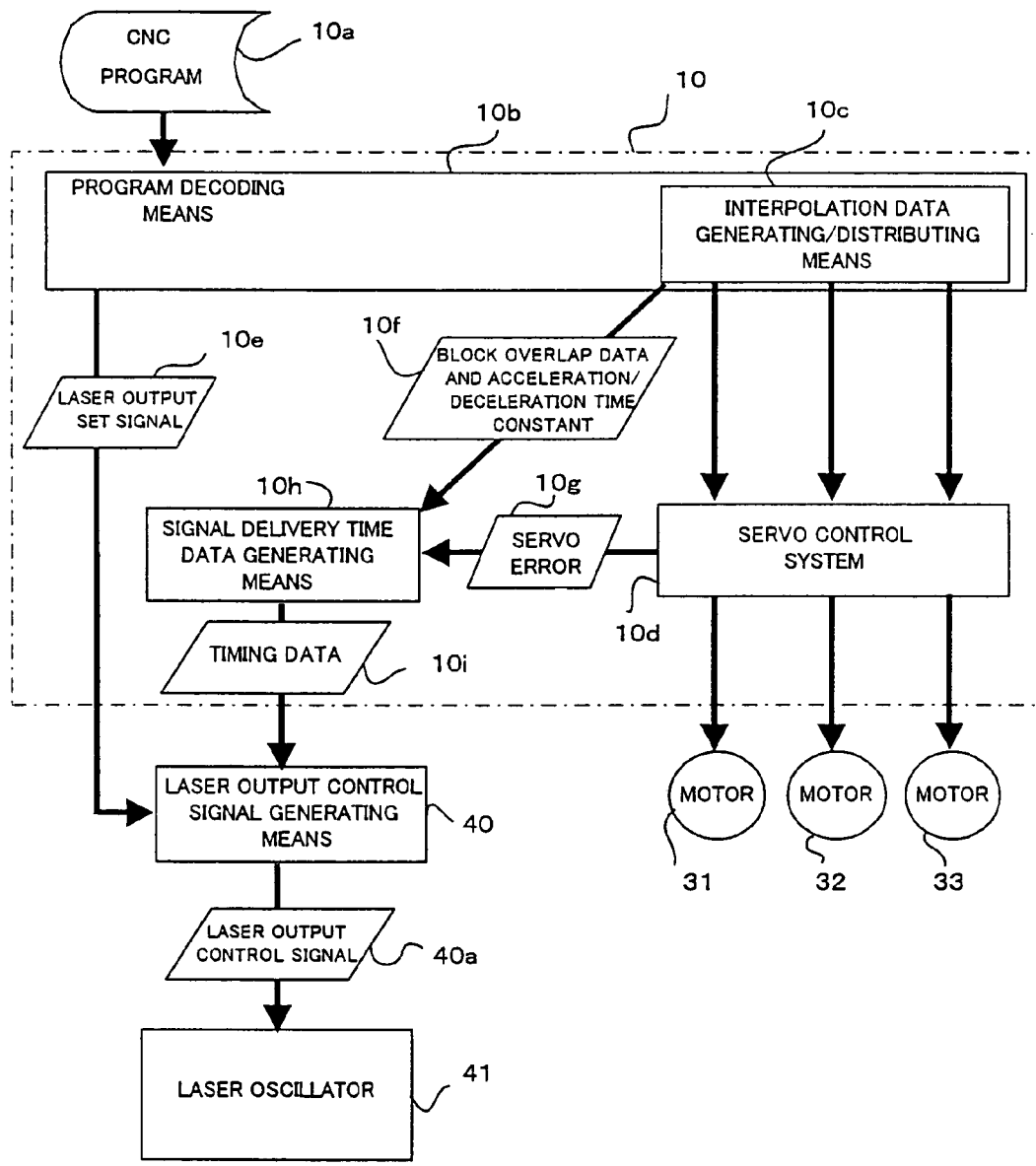
FIG. 3 is a function block diagram of an embodiment of this invention.

FIG. 3 is a functional block diagram of an embodiment of this invention. In the numerical control apparatus 10 for controlling a laser beam machine, program decoding means 10b decodes an input machining program 10a, and interpolation data generating/distributing means 10c distributes a motion command for every interpolation period to a servo control system 10d on the basis of a motion command instructed by the NC machining program 10a. Based on the distributed motion command, the servo control system 10*d* performs feedback control of position, speed and current, to thereby drive axis servomotors 31–33 to move a workpiece.

The interpolation data generating/distributing means 10*c* supplies signal delivery time data generating means 10*h* with a ratio (Pa/(Pa+Pb)) between the remaining motion amount Pa, i.e., block overlap data, and the motion amount per interpolation period corresponding to the command speed and with an acceleration/deceleration time constant, which are shown by 10*f*. The servo control system 10*d* delivers a servo error 10*g* to the signal delivery time data generating means 10*h* which, based on these data, supplies laser output control signal generating means 40 with timing data 10*i* regarding the laser output control signal that serves as a command for changing the laser output condition. The laser output control signal generating means 40 receives a laser output set signal 10*e* indicative of the laser output condition instructed by the program 10*a* output from the program decoding means 10*b* of the numerical control apparatus 10, and outputs the received laser output set signal 10*e*, as a laser output control signal 40*a*, to a laser oscillator 41 at a time point determined based on the received timing data 10*i*.

In the above, the operation of the present embodiment has been explained.

Next, the construction of this embodiment will be explained.

Figure 4:
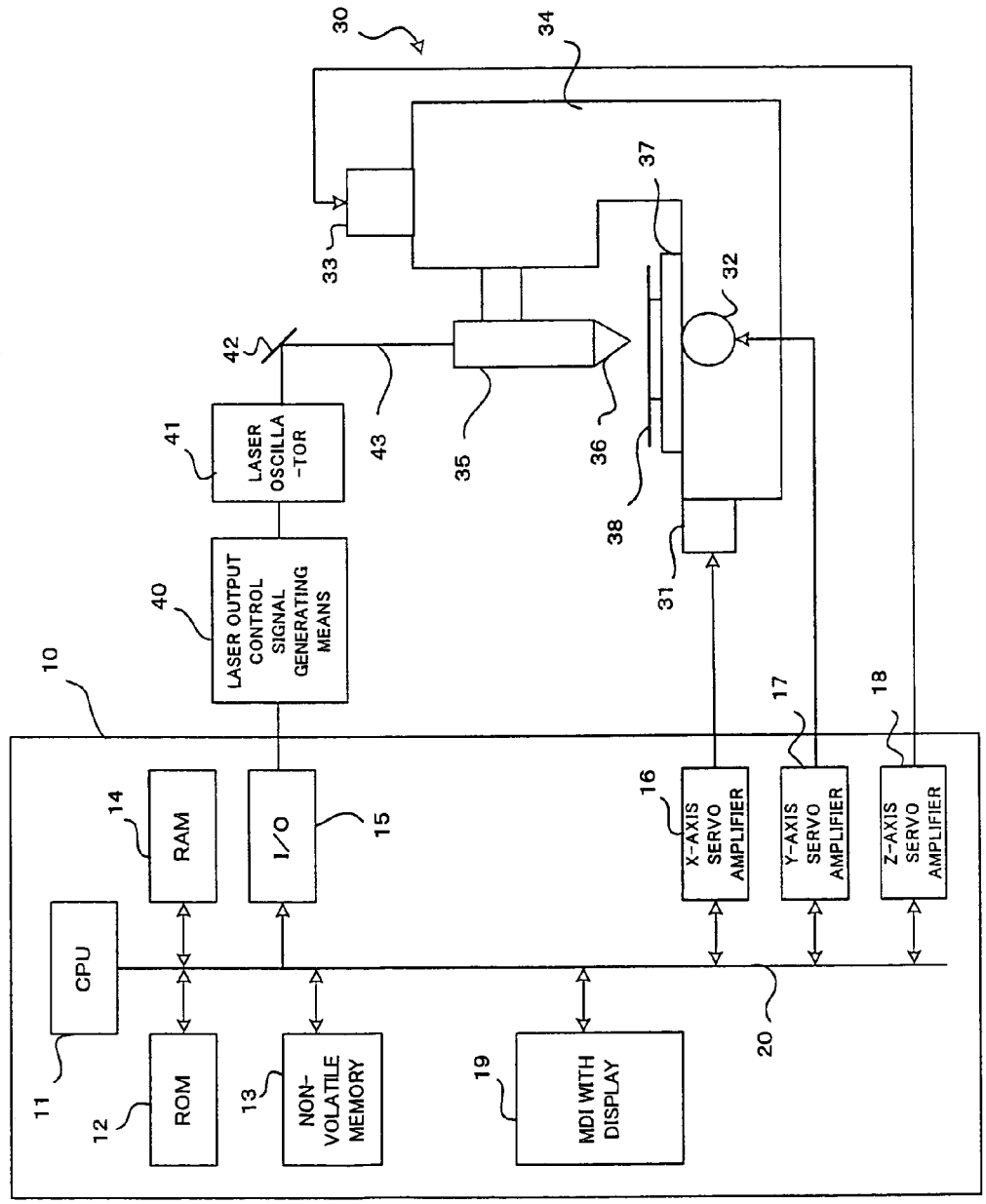
FIG. 4 is a schematic view showing a laser machining apparatus 30 according to the embodiment.

FIG. 4 is a schematic view of the laser beam machine 30 of this embodiment, in which reference numeral 10 denotes the numerical control apparatus (CNC) serving as a control unit to control the laser beam machine. The numerical control apparatus 10 is mainly constituted by a processor (CPU) 11 to which connected through a bus 20 are a ROM 12, a RAM 14, a non-volatile memory 13 constituted by a battery backed-up CMOSRAM, an input/output interface 15, an MDI (manual input mean) 19 with a display unit (such as CRT or liquid crystal display), X-axis and Y-axis (machining feed axis) servo amplifiers 16, 17, and a Z-axis (gap control axis) servo amplifier 18.

The ROM 12 is stored with a system program used to control the entirety of the laser beam machine 30, and the non-volatile memory 13 is stored with an NC program which is prepared utilizing the MDI 19 with display unit or which is input through an input interface, not shown. The RAM 14 is utilized for temporal data storage during various processing. Connected to the input/output interface 15 is the laser output control signal generating means 40 to which the laser oscillator 41 is connected. In this embodiment, the laser output control signal generating means 40 is constituted by a processor, a memory, etc., determines a laser output condition changeover timing based on the timing data for changeover of laser output conditions output from the processor 11 of the numerical control apparatus 10, and changes the laser output condition based on the laser output control signal that is output from the numerical control apparatus 10, thus controlling the laser oscillator 41.

In accordance with the laser output control signal, the laser oscillator 41 emits a laser beam 43, which is reflected by a bending mirror 42 to be transmitted to a machining head 35 by which the laser beam 43 are focused and irradiated onto a workpiece 38 through a distal end of a machining nozzle 36 attached to the machining head 35.

The X-axis servomotor 31 is connected to the X-axis servo amplifier 16 of the numerical control apparatus 10, the Y-axis servomotor 32 is connected to the Y-axis servo amplifier 17, and the Z-axis servomotor 33 is connected to the Z-axis servomotor 18. The servomotors 31, 32 and 3.3 are each attached with a position/speed detector such as a pulse coder for position/speed detection, from which the position and speed of the servomotor 31, 32 or 33 are fed back to the servo amplifier 16, 17 or 18. In accordance with the command from the processor 11 and the feedback signals of position and speed, the servo amplifiers 16, 17 and 18 control the positions and speeds of the servomotors 31, 32 and 33, respectively, each of which also carries out a current control based on a current detector, not shown. In this embodiment, the X-axis servo amplifier 16 cooperates with the Y-axis servo amplifier 17 and the Z-axis servo amplifier 18 to form the servo control system.

The above-mentioned laser beam machining apparatus differs in hardware construction from the conventionally known laser beam machining apparatus in that the laser output signal generating means 40 is added.

Next, the operational processing in this embodiment will be explained.

Figure 5:
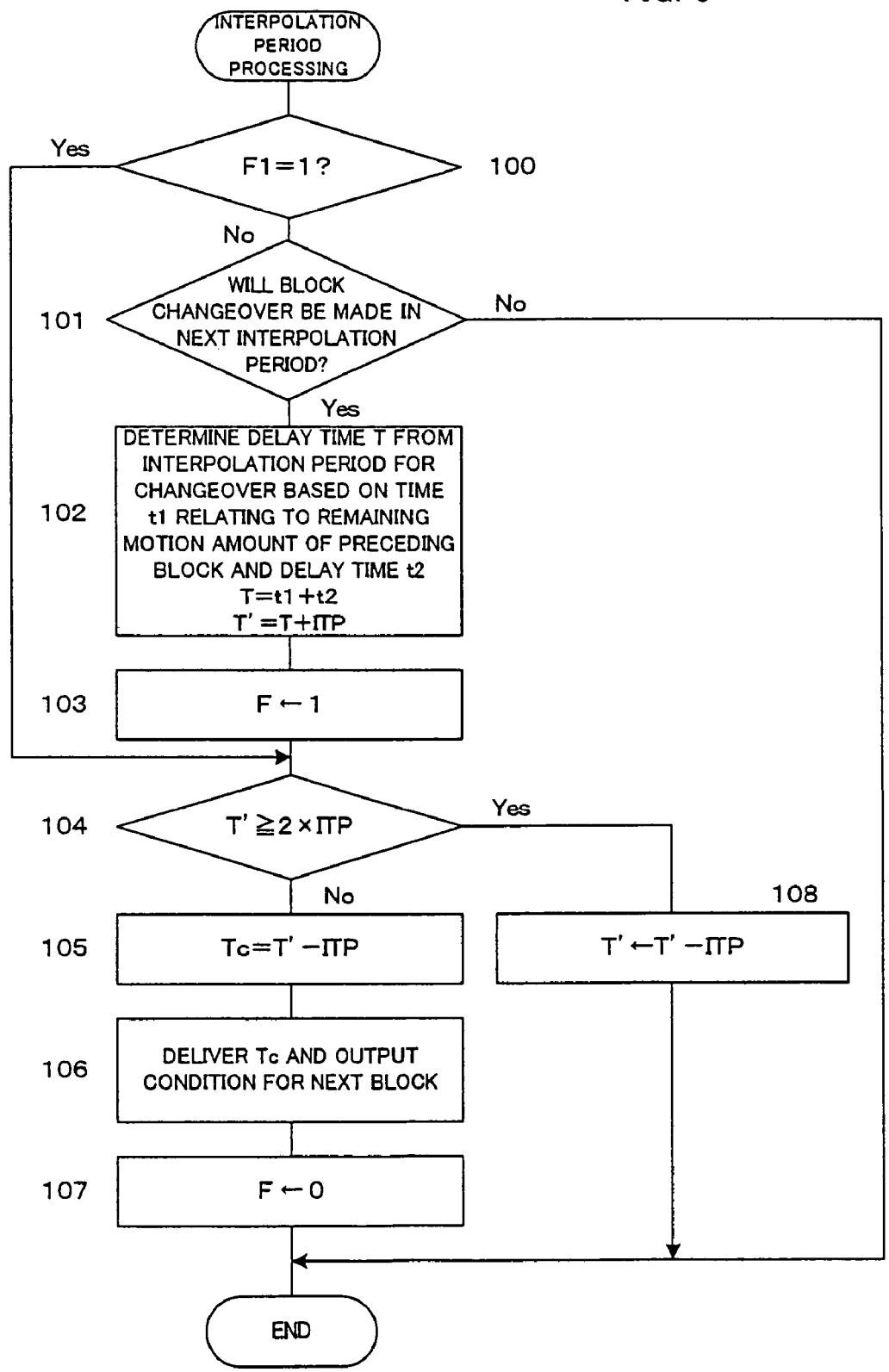
FIG. 5 is a flowchart showing processing performed by a numerical control apparatus in the embodiment.

FIG. 5 is a flowchart of processing executed for every interpolation period by the processor 11 of the numerical control apparatus, and FIG. 6 is a flowchart of processing executed by the laser output control signal generating means 40 for every period that is the same as the interpolation period.

The processor 11 of the numerical control apparatus 10 reads and decodes command blocks in sequence, and performs processing such as output of motion commands to the X-axis, Y-axis and Z-axis servo amplifiers 16–18 for every interpolation period, whereby the drive of the laser beam machine is controlled. As for these respects, the processing is the same as the conventional one. In this invention, when a block overlap command is delivered, the processor 11 executes the processing shown in FIG. 5 for every interpolation period.

At first, a determination is made as to whether a flag F1 is set at "1" indicating that preparations for changeover of laser output conditions are currently underway (Step 100), and if not so, whether a changeover to the next block will be made in the next interpolation period is determined (Step 101). More specifically, a determination is made as to whether the remaining of a command motion amount, i.e., the distance to go, in the current block is less than the total of motion amounts delivered in the current and next interpolation periods. If no block changeover will be made in the next interpolation period, the processing in the current interpolation period is finished.

If it is determined that the block changeover will occur in the next interpolation period, the calculation based on formula (1) is carried out, using the remaining motion amount Pa of the current block for the next interpolation period immediately after the block changeover and the command motion amount (Pa+Pb) for the interpolation period determined by the command speed, thus determining the time period t1 from when the next block starts to when the block changeover will occur. Further, the delay time t2 is determined from an amount of servo error and an acceleration/deceleration time constant, and the calculation of formula (2) is performed to determine the time period T measured from the start of the interpolation period in which the block changeover will occur. In this embodiment, the laser output control signal and the changeover time T are set in the interpolation period that is one period earlier than the period in which the block changeover will commence, and thus the time T' is determined by adding the interpolation period length ITP to the changeover time T (Step 102). Then, the flag F1 is set at "1" to indicate that the preparations of changeover of laser output conditions are under way (Step 103).

Next, a determination is made as to whether the time T' determined at Step 102 is more than two times as large as the interpolation period length ITP (Step 104), and if so, the time T' is renewed by subtracting the interpolation period length ITP from the time T' (Step 108), whereupon the processing in the current interpolation period is finished.

In the next and subsequent interpolation periods, the processing of Steps 100, 104 and 108 is executed since the flag F1 is set at 1. When it is determined at Step 104 that the time T' is not more than two times as large as the interpolation period length ITP, i.e., when the current interpolation period is one period earlier than the interpolation period in which the laser output condition will be changed, the flow advances from Step 104 to Step 105 where the interpolation period length ITP is subtracted from the time T', to determine the changeover time Tc from the start of the interpolation period in which the laser output condition will be changed. The determined changeover time Tc, serving as signal delivery time data, and the laser output condition are output, as the laser output control signal, to the laser output control signal generating means 40 (Step 106). The flag F1 is set to 0, and the processing of the current interpolation period is finished.

In the example shown in FIG. 1 where the laser output condition is changed without taking account of a delay time, the processing of Step 102 is performed in the interpolation period $Q_{-1}$ that is one period earlier than the interpolation period $Q_0$ in which the block changeover is made. In the example of FIG. 1, since t2=0 and T=t1, there is a relation of T'=T+ITP=t1+ITP. As a result, the relation of T'=t1+ITP<2×ITP is satisfied, so that the flow advances from Step 104 to Step 105 where the time Tc is determined as Tc=T'−ITP=t1. At Step 106, the time Tc=t1 and the laser output control signal are delivered to the laser output control signal generating means 40.

In the example shown in FIG. 2, the processing of Step 102 is carried out in the interpolation period $Q_{-1}$ that is one period earlier than the interpolation period $Q_0$ in which the block changeover is made. In the example of FIG. 2, the relation of T=t1+t2=3×ITP+α (where α is a value smaller than ITP and indicating a time period from when the interpolation period starts in which the laser output condition is changed to when the changeover is made) is satisfied, so that T'=T+ITP=4×ITP+α is attained. Thus, at the time point when the three interpolation periods ($Q_{-1}$, $Q_0$, and $Q_1$) including the current interpolation period have elapsed, the relation of T'=ITP+α resulting from the processing of Step 108 is attained, and hence T'=ITP+α<2×ITP is detected at Step 104 in the interpolation period $Q_2$. Thus, the flow advances to Step 105 where Tc=α is determined, and the changeover time Tc determined at Step 105 and the laser output condition are output to the laser output control signal generating means 40.

As described above, the interpolation period in which the laser output control signal and the changeover time Tc are delivered is one period earlier than the interpolation period in which the laser output condition is changed. Such period is the interpolation period $Q_{-1}$ for the example of FIG. 1 and the period $Q_2$ for the example of FIG. 2.

The processor of the laser output control signal generating means 40 executes the processing shown in FIG. 6 at intervals of a period that is the same as the interpolation period. First, whether a flag F2 is set at "1" indicating that the changeover of laser output conditions has been set is determined (Step 200), and if not so, whether the changeover time Tc and the laser output control signal have been transmitted from the numerical control apparatus 10 is determined (Step 201). If they have not been transmitted as yet, the processing at the current period is finished.

On the other hand, if the changeover time Tc and the laser output control signal have been transmitted from the numerical control apparatus 10 as a result of the processing of Step 106 (Step 201), the changeover time Tc is set to a timer, and the laser output condition is set to a buffer (Step 202). Then, the flag F2 is set to 1 and the processing of the current period is finished.

In the next period, the flow advances from Step 200 to Step 204 since the flag F2 has been set at 1, where the timer in which the changeover time is set is started. Then, a standby state is entered to await until the changeover time Tc has been measured by the timer (Step 205). When the changeover time has elapsed, the laser output control signal stored in the buffer is output to the laser oscillator 41 (Step 206), the flag F2 is set to 0, and the processing of the current period is finished.

With the aforementioned processing, in the example shown in FIG. 1, the changeover time Tc is set to the timer and the laser output condition is set to the buffer in the interpolation period $Q_{-1}$, and when the changeover time Tc (=t1) has elapsed from the start of the interpolation period $Q_0$, the laser output condition is changed.

In the example shown in FIG. 2, the changeover time Tc is set to the timer and the laser output condition is set to the buffer in the interpolation period $Q_2$, and when the changeover time Tc (=α) has elapsed from the start of the interpolation period $Q_3$, the laser output condition is changed.

In the foregoing embodiment, the laser output control signal and the changeover time are delivered to the laser output control signal generating means 40 in the interpolation period that is one period earlier than the period in which the laser output condition is changed. However, it is not inevitably necessary to effect such operations one period earlier, but these operations may be made several periods earlier. Also in this case, the number of interpolation periods may be counted on the side of the laser output control signal generating means 40, to determine the interpolation period in which the laser output control signal for changing the laser output condition is to be delivered, and when the transmitted changeover time has elapsed from the start of the determined interpolation period, the laser output control signal may be output.

In the embodiment, the laser output condition is changed at the boundary between successive blocks, such change may be made at an arbitrary position or time point other than between the successive blocks.

For instance, an external changeover command may be input to the laser output control signal generating means 40 which responds to this input signal to change the laser output condition.

Alternatively, a time period from start of machining used for changeover of laser output conditions and the laser output condition may be set in advance using an NC machining program or input means 19, so as to change the laser output condition when the thus set time period has elapsed from the start of machining. In this case, a time Ts' is determined by subtracting the time (2×ITP), which is twice as large as the interpolation period length, from the time period Ts that is set using the NC machining program or input means 19, and the determined time Ts' and the laser output condition corresponding to the time period Ts are stored in pair. By way of example, in a case where time periods Ts0, Ts1, Ts2, Ts3 and laser output conditions C0, C1, C2, C3 are set, times Ts0', Ts1', Ts2' and Ts3' individually obtained by subtracting the time (2×ITP) twice as large as the interpolation period length from the set time periods are stored into the non-volatile memory 13 in pair with the laser output condition concerned, in the form of the table prepared as shown in FIG. 7 in which i indicates index.

Figure 8:
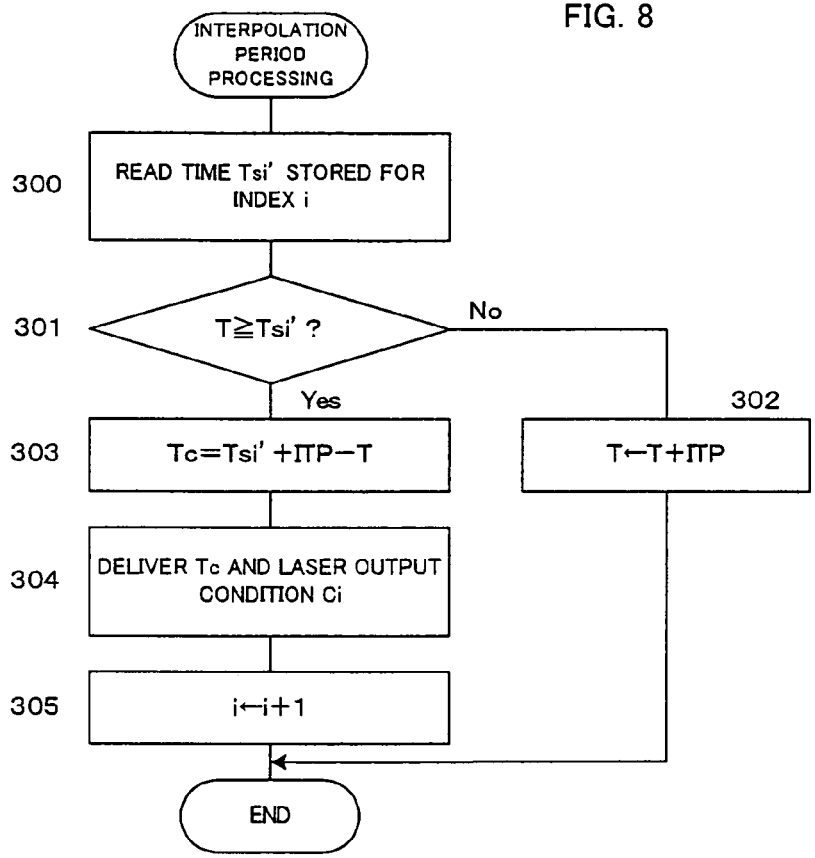
FIG. 8 is a flowchart showing processing performed by a numerical control apparatus according to another embodiment.

The processor 11 of the numerical control apparatus 10 executes the processing of FIG. 8 for every interpolation period. First, the time Tsi' corresponding to the index i (which is initially set to 0) is read out from the table (Step 300). Then, whether a value in a register T for time measurement is equal to or larger than the read out time Tsi' is determined (Step 301). If the value in the register T is not equal to or larger than the time Tsi', the interpolation period length ITP is added to the register T (Step 302), and the processing of the current interpolation period is finished. Subsequently, the above processing is executed for every interpolation period, and if it is detected at Step 301 that the value of the register T becomes equal to or larger than the time Tsi', the interpolation period length ITP is added to the time Tsi', and from the resultant value, the value of the register T is subtracted to thereby determine the time Tc for changeover of laser output conditions (Step 303).

$$Tc=Tsi'+ITP-T \quad (3)$$

Figure 9:
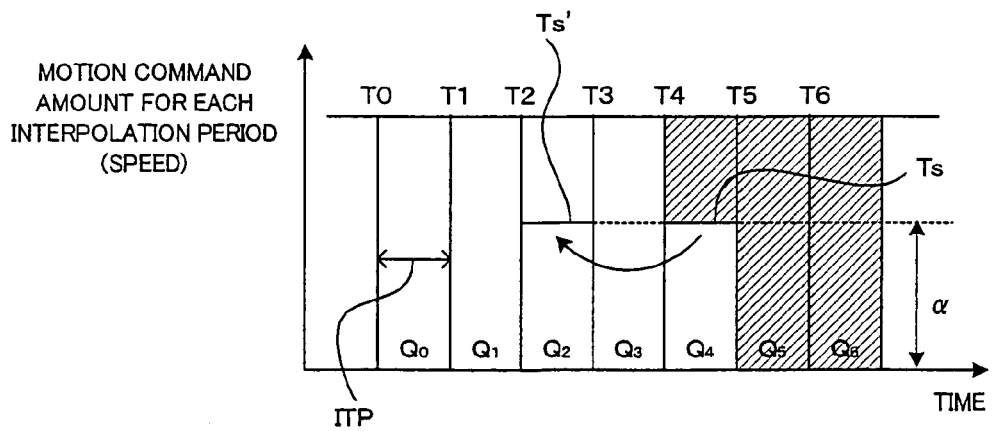
FIG. 9 is a view for explaining a laser output condition changeover time in another embodiment.

FIG. 9 is a view for explaining the laser output condition changeover time Tc, in which $Q_0$–$Q_6$ each denote an interpolation period, and T0–T6 each denote a value of the register T at start of a corresponding interpolation period, i.e., a time point at which that interpolation period starts. In the example of FIG. 9, the time Ts used to change the laser output condition is in the course of the interpolation period $Q_4$, at which time α has elapsed from the start time point T4 of the interpolation period $Q_4$. The time Ts' obtained by subtracting the doubled interpolation period length (2×ITP) indicates a time point at which α has elapsed from the start time point Ts of the interpolation period $Q_2$. After the interpolation period $Q_3$ is entered, when the stored value in the register T becomes equal to T3, the relation of T=T3≧Ts' is satisfied. Thus, the flow advances from Step 301 to Step 303 where the calculation of formula (3), i.e., Tc=Ts'+ITP−T=Ts'+ITP−T3=α, is performed to determine the time Tc=α from when the interpolation period starts to when the laser output condition is to be changed.

The determined Tc=α, serving as signal delivery time data, and the corresponding stored laser output condition Ci are output, as laser output control signal, to the laser output control signal generating means 40 (Step 304). Then, the index i is incremented by one (Step 305), and the processing in the period $Q_3$ is finished. In the laser output control signal generating means 40, the processing of FIG. 6 is performed, whereby the time Tc=α is set to the timer and the laser output condition is set to the buffer in the interpolation period that is one period earlier than the period in which the laser output condition is to be changed. When the time Tc=α has elapsed from when the next interpolation period started, the laser output condition set to the buffer is delivered to the laser oscillator 41, and laser machining is performed according to the changed condition.

In the embodiment, the laser output condition is output from the numerical control apparatus to the laser output control signal generating means 40, together with the output start time Tc, as the laser output control signal. Alternatively, a plurality of laser output conditions, including start/end of laser output, may be stored in the laser output control signal generating means 40, and the numerical control apparatus may output a selection signal for selecting one of the stored laser output conditions to the laser output control signal generating means 40 together with the time Tc.

In case this invention is applied to a numerical control apparatus using the interpolation period of, e.g., 1 msec, the laser beam may be irradiated for 0.137 msec from when 0.232 msec has elapsed from the start of the interpolation period concerned. In this case, the numerical control apparatus 10 may output and set the times of 0.232 msec and (0.232+0.137) msec at which the laser output is to be turned off and turned off to the laser output control signal generating means 40 for every interpolation period (or these times may be set in timers), and a turn on command or a turn off command may be output to the laser oscillator 41 when elapse of the turn on time or the turn off time is determined by measurement means which measures the time elapsed from start of interpolation period (or when the corresponding timer is time up). In this case, instead of time, a ratio by which the interpolation period length ITP is divided may be delivered, as the signal delivery time data, from the numerical control apparatus 10 to the laser output control signal generating means 40 that multiplies the interpolation period length ITP by the transmitted division ratio to determine a turn on time and turn of time at which a laser output turn on or off command may be delivered. Alternatively, without intervention of the numerical control apparatus, the laser output turn on time and turn off time may be set to the laser output control signal generating means 40 that turns on/off the laser output at that time for every interpolation period.

In a case where, other than the drive axes of the servo system, a shaft that is rotatable at high speed is provided to rotate a workpiece to be subject to laser irradiation for its ¼ periphery, the laser irradiation time is 6.25 msec, if the workpiece is rotated at a speed of 2400 rpm. In that case, by setting a laser output turn off timing at 6.25 msec after start of laser irradiation, the laser irradiation is stopped upon elapse of 0.25 msec in the 7th interpolation period, and the laser machining can be made accurately.

In the embodiment, the interpolation period at intervals of which the motion command is output is the same as the period at intervals of which signals are delivered to the laser output control signal generating means 40. However, these two periods may be different from each other. For instance, the interpolation period for delivery of motion command to the servo control system may be 0.5 msec and the period for delivery of signal to the laser output control signal generating means 40 may be 16 msec, so that the numerical control apparatus may only be required to carry out the arithmetic processing for laser operations at a frequency that is 1/32 part of the frequency of processing for servo operations.

According to this invention, a load of the numerical control apparatus can be reduced, and the laser output condition such as turning on/off of laser output can be changed in units of time that is shorter than the interpolation period in the numerical control apparatus, thus making it possible to perform laser machining with high accuracy at high speeds.

What is claimed is:

1. A laser machining apparatus comprising:
   a laser beam machine having a machining head irradiating a laser beam on a workpiece;
   a laser oscillator generating the laser beam;
   a controller controlling said laser beam machine by delivering motion commands to move the machining head relatively to the workpiece at predetermined interpolation periods, and controlling said laser oscillator to output the laser beam in accordance with motion of the machining head of the laser beam machine, said controller including a timing data generating unit to generate timing data defining time to deliver a laser output control signal to said laser oscillator in terms of a time period from a start of an interpolation period in which the laser output control signal is to be delivered, or in terms of a ratio of dividing said interpolation period; and a laser output control signal generating unit to receive the timing data from said timing data generating unit and to delay a delivery of the laser output control signal to said laser oscillator by the time period from the start of said interpolation period or by a time period calculated based on the ratio of dividing the interpolation period.

2. A laser machining apparatus according to claim 1, wherein said controller delivers a machining condition designation signal to designate a laser output condition including on/off of the laser output or to select one of laser output conditions stored in said laser output control signal generating unit to said laser output control signal generating unit, together with the timing data.

3. A laser machining apparatus according to claim 1, wherein the timing data are provided in terms of a ratio between motion amounts of successive motion commands for the interpolation period in which the motion amounts of the successive motion commands are added together or in terms of a value calculated based on the ratio.

4. A laser machining apparatus according to claim 1, wherein said timing data generating unit determines the time period from the start of the interpolation period based on elapsed time from a start of machining and a set time period.

5. A laser machining apparatus according to claim 1, wherein said timing data generating unit determines the timing data taking account of one or both of a delay time in a servo feedback system for processing motion commands and a delay time in the laser oscillator.

6. A laser machining apparatus according to claim 1, wherein a predetermined period at which the signal is delivered to the laser output control signal generating unit is several times longer than the predetermined interpolation period at which the motion command is delivered.

7. A laser machining apparatus according to claim 1, wherein said timing data generating unit delivers the timing data to said laser output control signal generating unit at an interpolation period one period prior to the interpolation period in which the laser output control signal is to be delivered.

8. A laser machining apparatus according to claim 1, wherein said interpolation periods at which the motion command is output can be different then the period intervals at which signals are delivered to said laser output control signal generating unit allowing for more accurate machining.

9. A laser machining apparatus according to claim 1, wherein the load of said controller controlling said laser beam is reduced allowing for more accurate machining.

10. A method for laser machining, comprising:

irradiating a laser beam on a workpiece;

controlling movement of the laser beam based on motion commands at predetermined interpolation periods;

generating timing data to define a time to deliver a laser output control signal used to control the laser beam in terms of a time period from a start of an interpolation period in which the laser output control signal is to be delivered, or in terms of a ratio of dividing the interpolation period;

delaying a delivery of the laser output control signal by a time period from the start of the interpolation period or by a time period calculated based on the ratio of dividing the interpolation period.

11. A method for laser machining according to claim 10, further comprising generating a machining condition designation signal to designate a laser beam output condition including on/off of the laser output or to select one of laser output conditions stored in a laser output control signal generating unit to the laser output control signal generating unit, together with the timing data.

12. A method for laser machining according to claim 10, wherein said generating timing data determines the timing data in terms of a ratio between motion amounts of successive motion commands for the interpolation period in which the motion amounts of the successive motion commands are added together or in terms of a value calculated based on the ratio.

13. A method for laser machining according to claim 10, wherein said generating timing data determines the time period from the start of the interpolation period based on elapsed time from a start of machining and a set time period.

14. A method for laser machining according to claim 10, wherein said generating timing data determines the timing data taking account of one or both of a delay time in a servo feedback system for processing motion commands and a delay time in the laser beam machine.

15. A method for laser machining according to claim 10, further comprising generating a predetermined period at which the signal is delivered to a laser output control signal generating unit is several times longer than the predetermined interpolation period at which the motion command is delivered.

16. A method for laser machining according to claim 10, wherein said generating timing data delivers the timing data to a laser output control signal generating unit at an interpolation period one period prior to the interpolation period in which the laser output control signal is to be delivered.

* * * * *

UNITED STATES PATENT AND TRADEMARK OFFICE
CERTIFICATE OF CORRECTION

PATENT NO. : 7,012,215 B2  Page 1 of 1
APPLICATION NO. : 10/715124
DATED : March 14, 2006
INVENTOR(S) : Atsushi Mori It is certified that error appears in the above-identified patent and that said Letters Patent is hereby corrected as shown below:

TITLE page in the 5th line of ITEM (57) ABSTRACT, delete "Q0" and insert --$Q_0$--

TITLE page in the 11th line of ITEM (57) ABSTRACT, delete "Q-1," and insert --$Q_{-1}$,--

TITLE page in the 14th line of ITEM (57) ABSTRACT, delete "Q0," and insert --$Q_0$,-- column 5, line 67 delete "3.3" and insert --33-- column 9, line 28 delete "$Q_0$-Q6" and insert --$Q_0$-$Q_6$--

Signed and Sealed this

First Day of August, 2006

JON W. DUDAS
*Director of the United States Patent and Trademark Office*